United States Patent
deLaneuville et al.

(10) Patent No.: US 9,204,109 B1
(45) Date of Patent: Dec. 1, 2015

(54) IR DETECTION OF SMALL CRACKS DURING FATIGUE TESTING

(71) Applicant: Florida Turbine Technologies, Inc., Jupiter, FL (US)

(72) Inventors: Robert E deLaneuville, Hobe Sound, FL (US); Kenneth I Nelson, Stuart, FL (US); John A Polywoda, III, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 390 days.

(21) Appl. No.: 13/664,489

(22) Filed: Oct. 31, 2012

(51) Int. Cl.
*H04N 7/00* (2011.01)
*H04N 7/18* (2006.01)

(52) U.S. Cl.
CPC ...... *H04N 7/183* (2013.01); *G06T 2207/30164* (2013.01)

(58) Field of Classification Search
CPC ............... G01N 21/8806; H04N 7/183; G06T 2207/30164; G06T 7/0004; G06T 7/001
See application file for complete search history.

(56) References Cited

U.S. PATENT DOCUMENTS

| | | | |
|---|---|---|---|
| 4,383,218 A * | 5/1983 | Hansen et al. | 324/225 |
| 5,534,289 A * | 7/1996 | Bilder et al. | 427/8 |
| 5,764,518 A * | 6/1998 | Collins | 700/95 |
| 6,838,670 B2 * | 1/2005 | Lewis et al. | 250/341.6 |
| 7,057,176 B2 * | 6/2006 | Rothenfusser et al. | 250/341.6 |
| 7,549,339 B2 * | 6/2009 | Staroselsky et al. | 73/601 |
| 2003/0106376 A1 * | 6/2003 | Shirzad et al. | 73/606 |
| 2004/0041096 A1 * | 3/2004 | Sun et al. | 250/341.6 |
| 2004/0051035 A1 * | 3/2004 | Zombo et al. | 250/252.1 |
| 2004/0217289 A1 * | 11/2004 | Raulerson et al. | 250/341.6 |
| 2005/0151083 A1 * | 7/2005 | Favro et al. | 250/341.6 |
| 2007/0045544 A1 * | 3/2007 | Favro et al. | 250/341.6 |
| 2008/0022775 A1 * | 1/2008 | Sathish et al. | 73/606 |
| 2011/0003119 A1 * | 1/2011 | Doesburg et al. | 428/155 |

OTHER PUBLICATIONS

Chen, et al. ASTM E647 00, Standard test method for measurement of fatigue crack growth rates, ASTM International 2005; In Review of Progress in QNDE, 25B, AIP Conference Proceedings edited by D.O. Thompson and D.E. Chimenti, vol. 820, pp. 1577 1584, 2006 (American Institute of Physics: Melville, NY.*

* cited by examiner

*Primary Examiner* — Jay Patel
*Assistant Examiner* — Frank Huang
(74) *Attorney, Agent, or Firm* — John Ryznic

(57) ABSTRACT

A process for producing a small crack in a turbine rotor blade for use in training inspectors to be qualified for inspecting blades with small crack, where each blade is vibrated in order to initiate a small crack under observation using an IR camera that can detect for a small crack, and when a small crack at a desired size is produced on the blade, the vibration is stopped and the blade removed and then used in a training process to train and qualify an inspector for an inspection process.

2 Claims, 3 Drawing Sheets

IR DETECTION OF SMALL CRACKS DURING FATIGUE TESTING

CROSS-REFERENCE TO RELATED APPLICATIONS

None.

GOVERNMENT LICENSE RIGHTS

None.

BACKGROUND OF THE INVENTION

1. Field of the Invention

The present invention relates generally to a process for testing a turbine rotor blade for a small crack, and more specifically to a process for inducing a small crack in a turbine rotor blade for use in testing for cracks.

2. Description of the Related Art Including Information Disclosed Under 37 CFR 1.97 and 1.98

In a gas turbine engine, such as an aero engine used to power an aircraft, parts of the engine are often tested for cracks in order to prevent a catastrophic failure during operation. A turbine rotor blade or a rotor disk with a small crack could grow to a critical size that would result in the part breaking, and thus severe engine damage could occur with possible loss of life.

The Federal Aviation Administration (or FAA), United States Air Force (USAF), United States Navy etc. require engines to be disassembled and inspected after a certain number of hours of operation in order to determine if a part should be replaced. In the case of a turbine rotor blade, each blade in an engine is inspected for a small crack using one of several prior art testing processes. In order for the inspectors to be trained in discovering cracks, sample blades or components are cracked using prior art processes. In one such process, a turbine blade is removed from the engine and secured on a shaker table. The blade is excited by the shaker at a resonance frequency and crack detection is observed by a drop in frequency of the blade during shaking. This process often leads to the formation of large cracks in the blade. In another process, the blade is excited by a shaker at a resonance frequency and a technician uses an ocular method to observe for a crack initiation. This method does not necessarily lead to consistent results.

The FAA etc., requires inspectors to be trained and qualified on how to find a small crack in a part such as a turbine rotor blade. Various methods are used to qualify inspectors in detection of small cracks. In one such process, a florescence die is used to identify a small crack. Another includes visual observation. Inspectors are instructed on how to find small cracks by practice. However, the prior art processes for inducing a crack in a part such as a turbine blade are not very useful in that only larger cracks are produced in the part.

BRIEF SUMMARY OF THE INVENTION

A method for inspecting a part, such as a turbine rotor blade, for a crack so that a defective part is not reused in machine such as a gas turbine engine. A turbine blade without a crack is secured on a shaker table and is vibrated until a small crack is produced. An IR camera is used to detect when the small crack has been produced. A number of turbine blades are vibrated so that a small crack is produced in each blade. The turbine blades with the small cracks are then used to train inspectors for identifying which blade has a small crack in order for inspectors to be trained and qualified on how to find a small crack in a part such as a turbine rotor blade.

DETAILED DESCRIPTION OF THE INVENTION

Figure 1:
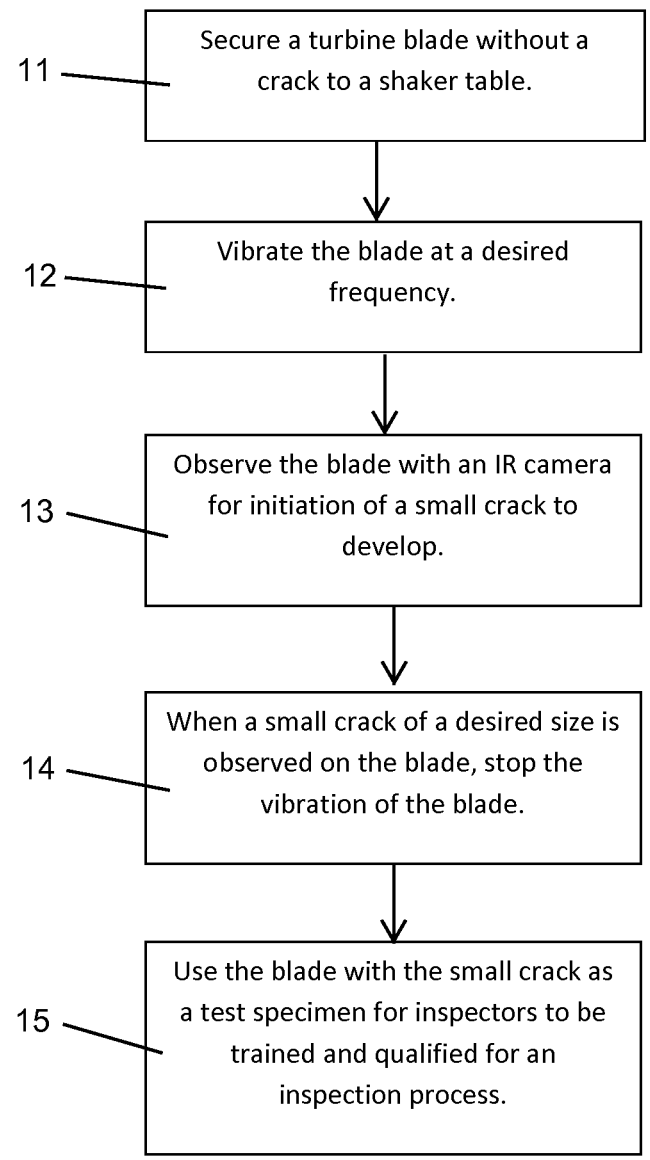
FIG. 1 shows a flow chart of the process for inducing a small crack in a turbine rotor blade and a process for inspecting the blade for a small crack.
Figure 2:
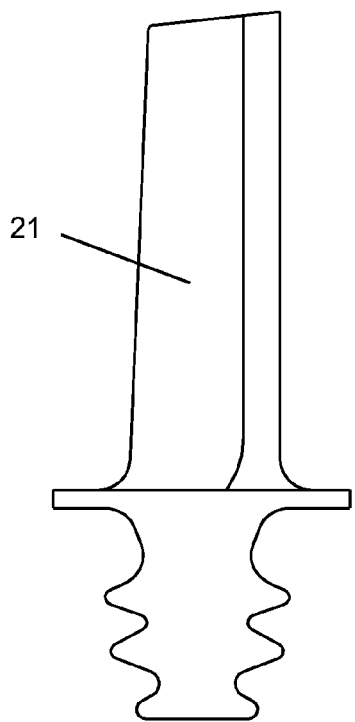
FIG. 2 shows a turbine rotor blade without a small crack secured to a shaker table.
Figure 3:
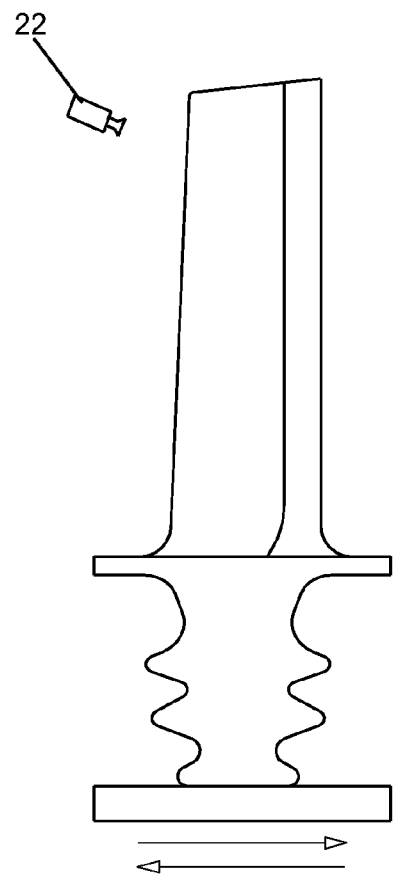
FIG. 3 shows a turbine rotor blade secured in a shaker table with a small crack.
Figure 4:
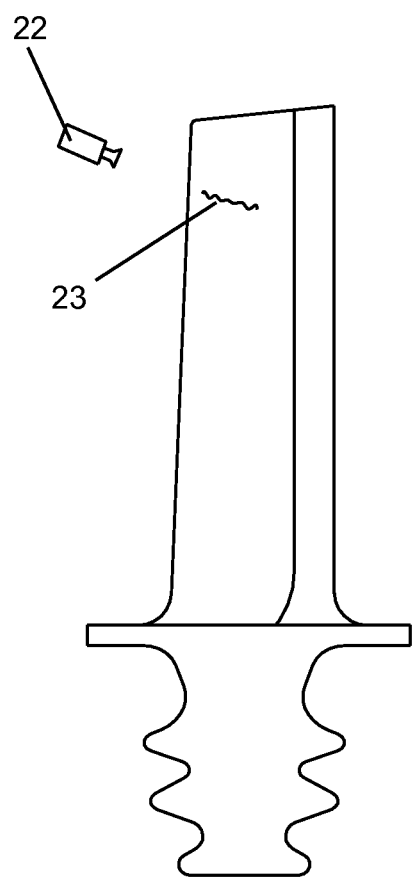
FIG. 4 shows a turbine rotor blade with a small crack being observed by an IR camera.

The present invention is a process for inducing a small crack in a part such as a turbine rotor blade, and a process for inspecting the part having a small crack therein. There is a need in the art of inspecting a part, such as a turbine rotor blade, for a small crack. Also, there is a need in the art for inducing a small crack in a part, such as a turbine rotor blade, that is not too large such that it would be very easy to observe the crack by a student inspector. The invention is described for use with a turbine rotor blade for a gas turbine engine. However, the present invention can be used for any part that must be inspected for a small crack to prevent a defective part from being used again such as a turbine rotor disk.

The process of the present invention can generate a small crack in a part and verify the crack's initiation by monitoring an infrared (IR) signal during vibratory loading of the part. An observable thermal infrared signal is generated at the crack location during the vibratory excitation. With the assistance of IR monitoring during the crack test, a very small crack can be detected due to a heat emission of the crack under oscillatory load. Using sensitive IR instrumentation, small changes in the thermal response of the component can be observed. These small changes allow for the user to detect a crack initiation quicker than in the prior art processes. Therefore, a small crack can be formed on the blade before the crack gets too big to be of use in training inspectors for observing a blade having a small crack.

A new turbine rotor blade without any crack 21 therein is secured on a shaker (step 11) such as a shaker table and then set to vibrate at a desired frequency in order to initiate a crack (step 12). An IR camera 22 is used to observe the blade for initiation of a small crack 23 (step 13). When a small crack has been formed in the blade and observed by the IR camera, the shaker is stopped and the blade having the small crack is removed (step 14). Because of the high sensitivity of the IR camera in observing a small crack in the blade, a very small crack can be formed and the vibration process stopped before the crack grows to such a large size that the crack would be very easy observed. The blade having the small crack therein is then used for training and qualifying inspectors on how to find a small crack in the blade (step 15).

A number of blades each having one or more small cracks can then be produced for use in training inspectors on how to detect for a small crack on a blade. By directing the vibration process, a small crack can be formed in different areas of the blade in order to eliminate redundancy. The process of the present invention can also be used for producing small crack on a part other than a turbine blade. Any part that requires inspection for a small crack to prevent early part failure can be used with the process of the present invention for producing a small crack and then testing the part for the presence of a small crack.

We claim the following:

1. A process for producing a small crack in a part comprising the steps of:
   securing a part without a small crack to a shaker table;
   vibrating the part at a desired frequency;
   observing the part with an IR camera to detect for an initiation of a small crack on the part;
   stopping the part from vibrating when a small crack not exceeding a desired size is observed on the part; and,
   removing the part with the small crack from the shaker table;
   wherein the part is one of a turbine rotor disk and turbine rotor blades of a gas turbine engine.

2. A process for training inspectors to be qualified for inspecting a part for a crack comprising the steps of:
   obtaining a number of parts without any cracks to be used for training inspectors;
   vibrating the number of parts at a desired frequency;
   observing the number of parts with an IR camera to detect for an initiation of a small crack on each of the parts;
   stopping each part from vibrating when a small crack not exceeding a desired size is observed on the part; and,
   using the number of parts each with a small crack therein to train inspectors to be qualified for inspecting a similar part for a small crack;
   wherein the part is one of a turbine rotor disk and turbine rotor blades used in a gas turbine engine.

* * * * *